(12) United States Patent
Wan

(10) Patent No.: US 11,930,242 B2
(45) Date of Patent: Mar. 12, 2024

(54) METHOD AND ELECTRONIC DEVICE FOR PLAYING STREAMING MEDIA

(71) Applicant: MediaTek Singapore Pte. Ltd., Singapore (SG)

(72) Inventor: Caohui Wan, Wuhan (CN)

(73) Assignee: MEDIATEK SINGAPORE PTE. LTD., Singapore (SG)

( * ) Notice: Subject to any disclaimer, the term of this patent is extended or adjusted under 35 U.S.C. 154(b) by 0 days.

(21) Appl. No.: 17/818,082

(22) Filed: Aug. 8, 2022

(65) Prior Publication Data

US 2024/0031638 A1 Jan. 25, 2024

(30) Foreign Application Priority Data

Jul. 20, 2022 (CN) .......................... 202210856678.4

(51) Int. Cl.
- *H04N 7/173* (2011.01)
- *H04N 21/433* (2011.01)
- *H04N 21/435* (2011.01)
- *H04N 21/845* (2011.01)

(52) U.S. Cl.
CPC ....... *H04N 21/4331* (2013.01); *H04N 21/435* (2013.01); *H04N 21/8456* (2013.01)

(58) Field of Classification Search
CPC ............. H04N 21/4331; H04N 21/435; H04N 21/8456
See application file for complete search history.

(56) References Cited

U.S. PATENT DOCUMENTS

| | | | |
|---|---|---|---|
| 2012/0023253 A1* | 1/2012 | Rhyu | H04L 65/61 709/231 |
| 2014/0229529 A1* | 8/2014 | Barone | H04L 65/103 709/203 |
| 2016/0198236 A1* | 7/2016 | Li | H04N 21/6181 709/219 |
| 2016/0308934 A1* | 10/2016 | Gholmieh | H04N 21/44209 |
| 2022/0217194 A1* | 7/2022 | Sodagar | H04L 65/612 |

* cited by examiner

Primary Examiner — Gigi L Dubasky
(74) Attorney, Agent, or Firm — McClure, Qualey & Rodack, LLP

(57) ABSTRACT

A method for playing streaming media comprising a plurality of segments includes receiving a segment of the streaming media; wherein the segment carries information of a segment Uniform Resource Identifier (URI) corresponding to itself; checking a Media Presentation Description (MPD) to find what Period, AdaptationSet, and Representation the segment belongs to based on the segment URI; and calculating time information of the segment based on time information of the Period where the segment is located and a zero point of an MPD timeline of the MPD.

21 Claims, 6 Drawing Sheets

METHOD AND ELECTRONIC DEVICE FOR PLAYING STREAMING MEDIA

CROSS REFERENCE TO RELATED APPLICATIONS

This application claims the benefit of China Application No. 202210856678.4 filed on Jul. 20, 2022, the entirety of which is/are incorporated by reference herein.

BACKGROUND OF THE INVENTION

Field of the Invention

The present invention relates to a playing method, and, in particular, to a method and electronic device for playing ROUTE/DASH streaming media.

Description of the Related Art

In ATSC3.0, the DASH Player can receive MPD and media segments through the broadcast channel, all DASH MPD timing is foundationally in UTC. The DASH Player requires accurate wall clock to calculate the appropriate start time and the available segments, fetch the corresponding media segments at the appropriate time for playback.

According to the current actual scene, the MPD that the DASH Player receives via broadcast channel might have been expired. For example, the MPD might has been generated in advance, and the time related information in the MPD hasn't been updated base on the current wall clock time when the stream was delivered. Even though the DASH Player can still receive the media segments data through broadcast channel, it's hard to determine which audio and video segments to be playback, and how to synchronize audio and video, because the audio and video are in different media segments.

Due to the large time difference between the time related information in the MPD and the current wall clock source, the DASH player might determine no available segment base on the MPD, even though it still could receive the media segments data. which may cause the DASH Player fail to start playback. In other cases, the segments received by the DASH Player and the available segments that calculated out by the DASH Player are very different, which may also cause the DASH Player fail to playback. In addition, in Broadband Distribution, the media segments are stored in the remote http server, the DASH Player requests the media segments at appropriate time and parse the media segments and playback. In Broadcast Distribution, the media segments are delivered via Broadcast channel, and stored in Local, and wait the DASH Player to fetch, it's hard to determine which segments are expired and should be removed from local.

BRIEF SUMMARY OF THE INVENTION

An embodiment of the present invention provides a method for playing streaming media. The streaming media includes a plurality of segments. The method includes the following steps. A segment of the streaming media is received. The segment carries information that includes its own segment URI. A Media Presentation Description (MPD) is checked to find what Period, AdaptationSet, and Representation the segment belongs to based on the segment URI. The time information of the segment is calculated based on the time information of the Period where the segment is located and a zero point on the MPD timeline.

According to the method described above, the method further comprises calculating time information of an availability window and a clock offset based on the time information of the segment and a duration of a time shift buffer in the MPD; and calculating a starting time point of the streaming media and finding the segment corresponding to the starting time point to play according to the time information of the availability window and the clock offset.

According to the method described above, the method further includes removing the expired segments.

According to the method described above, the time information of the segment includes the start time and the end time of the segment.

According to the method described above, the time information of the availability window includes the start time and the end time of the availability window.

According to the method described above, the step of checking MPD to find what Period, AdaptationSet, and Representation the segment belongs to based on the segment URI includes: checking the MPD to find the Representation, a segment number in the Representation, and the Period, that are matched by the segment URI.

According to the method described above, regarding the step of calculating the time information of the segment based on the time information of the Period where the segment is located and the zero point of the MPD timeline, the step includes calculating the segment start time and the segment duration of the segment in the Period based on the segment number in the Representation. The step also includes calculating the start time of the segment by adding the zero point of the MPD timeline, the period start time of the Period, and the segment start time of the segment in the Period. The step also includes calculating the end time of the segment by adding the zero point of the MPD timeline, period start time of the Period, the segment start time of the segment in the Period, and the segment duration of the segment.

According to the method described above, the method further includes calculating the time information of the segment as soon as the segment is received. The method further includes storing the segment into a queue in a cache. A segment in the same Representation in the same Period is able to be stored in the same queue.

According to the method described above, regarding the step of calculating the time information of the availability window and the clock offset based on the time information of the segment and a duration of the time shift buffer in the MPD, the step includes determining the queue start time as the earliest segment start time in the queue; determining the queue end time as the latest segment end time in the queue; determining the start time of the period availability window as the maximum value of the queue start time of all queues in the period; determining the end time of the period availability window as the minimum value of the queue end time of all queues in the period; determining the start time of the availability window as the minimum value of the start time of the period availability window of all periods in the MPD; and determining the end time of the availability window as the maximum value of the end time of the period availability window of all periods in the MPD.

According to the method described above, regarding the step of calculating the time information of the availability window and the clock offset based on the time information of the segment and a duration of the time shift buffer in the MPD, the step further includes calculating the expired segments based on a duration of the time shift buffer in the MPD if the clock offset has been calculated after the segment is received. The step further includes removing the expired segments.

According to the method described above, regarding the step of calculating the time information of the availability window and the clock offset based on the time information of the segment and a duration of the time shift buffer in the MPD, the step further includes obtaining current wall clock time if the clock offset has not been calculated yet after the time information of the availability window is calculated. The step further includes calculating the clock offset by subtracting the current wall clock time from the end time of the availability window.

According to the method described above, the step of removing the expired segments from the segments includes: setting a duration of a time shift buffer in the MPD as a predetermined value; setting the duration of the time shift buffer as a constant value if the predetermined value is not defined in the MPD; setting a current time point as a current wall clock time according to a wall clock; setting an expired time be the current time point adding a clock offset and minus the duration of the time shift buffer; defining the segments as the expired segments if the segment end time of the segments is less than the expired time; and removing the expired segments.

An embodiment of the present invention provides an electronic device for playing streaming media including a plurality of segments. The electronic device includes a processor and a cache. The processor is configured to execute the following steps. The processor receives a segment of the streaming media. The segment carries information that includes its own segment URI. A Media Presentation Description (MPD) is checked to find what Period, AdaptationSet, and Representation the segment belongs to based on the segment URI. The processor calculates the time information of the segment based on the time information of the Period where the segment is located and a zero point of the MPD timeline.

According to the electronic device described above, the processor calculates the time information of an availability window and a clock offset based on the time information of the segment and a duration of a time shift buffer in the MPD. The processor calculates the starting time point of the streaming media and finds the segment corresponding to the starting time point to play according to the time information of the availability window and the clock offset. The processor stores the segment into a queue in the cache.

According to the electronic device described above, the segment in the same Representation in the same Period is able to be stored in the same queue.

According to the electronic device described above, the processor removes expired segments.

According to the electronic device described above, the time information of the segment comprises the start time and the end time of the segment.

According to the electronic device described above, the time information of the availability window comprises the start time and the end time of the availability window.

According to the electronic device described above, the processor checks the MPD to find the Representation, a segment number in the Representation, and the Period, that are matched by the segment URI.

According to the electronic device described above, the processor calculates the segment start time and the segment duration of the segment in the Period based on the segment number in the Representation, calculates the start time of the segment by adding the zero point of the MPD timeline, a period start time of the Period, and the segment start time of the segment in the Period, and calculates the end time of the segment by adding the zero point of the MPD timeline, the period start time of the Period, the segment start time of the segment in the Period, and the segment duration of the segment.

According to the electronic device described above, the processor determines the queue start time as the earliest segment start time in the queue, determines the queue end time as the latest segment end time in the queue, determines the start time of the period availability window as the maximum value of the queue start time of all queues in the period, determines the end time of the period availability window as the minimum value of the queue end time of all queues in the period, determines the start time of the availability window as the minimum value of the start time of the period availability window of all periods in the MPD; and determines the end time of the availability window as the maximum value of the end time of the period availability window of all periods in the MPD.

According to the electronic device described above, the processor calculates expired segments based on the duration of the time shift buffer in the MPD if the clock offset has been calculated after the segment is received, and removes the expired segments.

According to the electronic device described above, the processor obtains Current wall clock time if the clock offset has not been calculated yet after the time information of the availability window is calculated; and calculates the clock offset by subtracting the Current wall clock time from the end time of the availability window.

According to the electronic device described above, the processor sets a duration of a time shift buffer in the MPD as a predetermined value, sets the duration of the time shift buffer as a constant value if the predetermined value is not defined in the MPD, sets a current time point as a current wall clock time according to a wall clock, sets an expired time be the current time point adding a clock offset and minus the duration of the time shift buffer, defines the segments as the expired segments if the segment end time of the segments is less than the expired time; and removes the expired segments.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is made for the purpose of illustrating the general principles of the invention and should not be taken in a limiting sense. The scope of the invention is best determined by reference to the appended claims.

Figure 1:
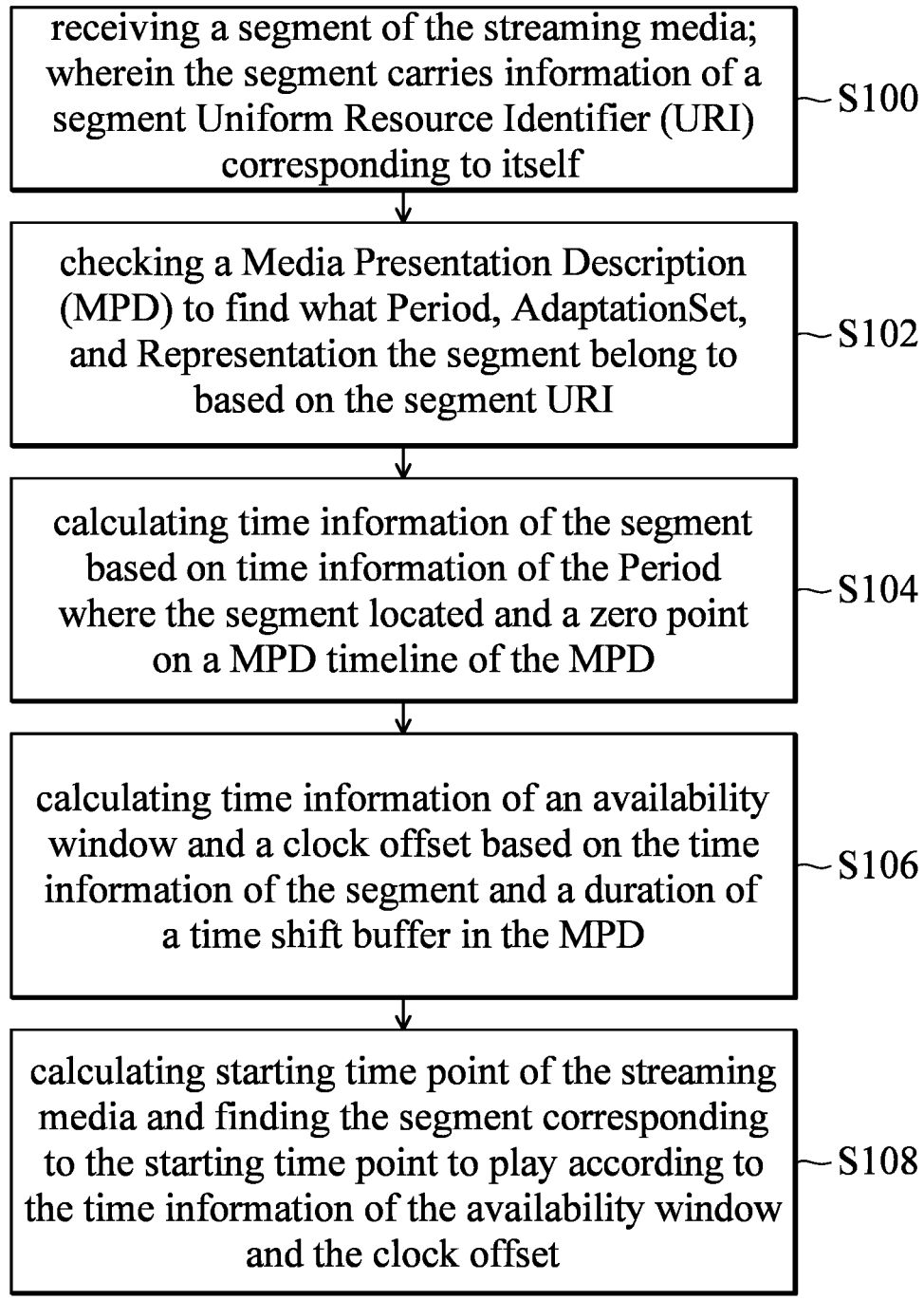
FIG. 1 is a flowchart of a method for playing streaming media in accordance with some embodiments of the present invention.

FIG. 1 is a flowchart of a method for playing streaming media in accordance with some embodiments of the present invention. As shown in FIG. 1, the method includes receiving a segment of the streaming media, wherein the segment carries information that includes its own segment URI (step S100); A Media Presentation Description (MPD) is checked to find what Period, AdaptationSet, and Representation the segment belongs to based on the segment Uniform Resource identifier (URI), for example, segment URL (step S102); calculating time information of the segment based on the time information of the Period where the segment is located and a zero point of an MPD timeline (the zero point of the MPD timeline is mapped to the point (MPD@availabilityStartTime) in wall clock time) (step S104).

In an embodiment, the method for playing streaming media further comprises calculating time information of an availability window and a clock offset based on the time information of the segment and a duration of a time shift buffer in the MPD (step S106); and calculating a starting time point of the streaming media and finding the segment corresponding to the starting time point to play according to the time information of the availability window, the available segments, and the clock offset (step S108). In some embodiments, the availability window is a time period that the DASH player can play segments. The clock offset is used to compensate the time difference between the current wall clock time and the end time of the availability window.

In MPEG-DASH protocol, streaming media is divided into a plurality of segments, so that a client can download the segments one by one from an HTTP server or a local platform. The MPD is like an index file indicating what the steaming media is composed during transmission. For example, the MPD may indicate a plurality of Periods. Each Period may be a scene, a song, or a video. The MPD also indicates the time length of each Period. A Period may include a plurality of AdaptionSets. Each AdaptionSet describes the information of the streaming media, such as a video stream or a sound stream. An AdaptionSet may include a plurality of Representations. Each Representation represents different screen sizes or bit rates. A Representation includes a plurality of Segments. Each Segment is actually sound data or a video data.

In some embodiments of step S100, the segment is received from an HTTP server or a local platform, such as a smart phone, a tablet, a laptop or a desktop, but the present invention is not limited thereto.

Figure 2:
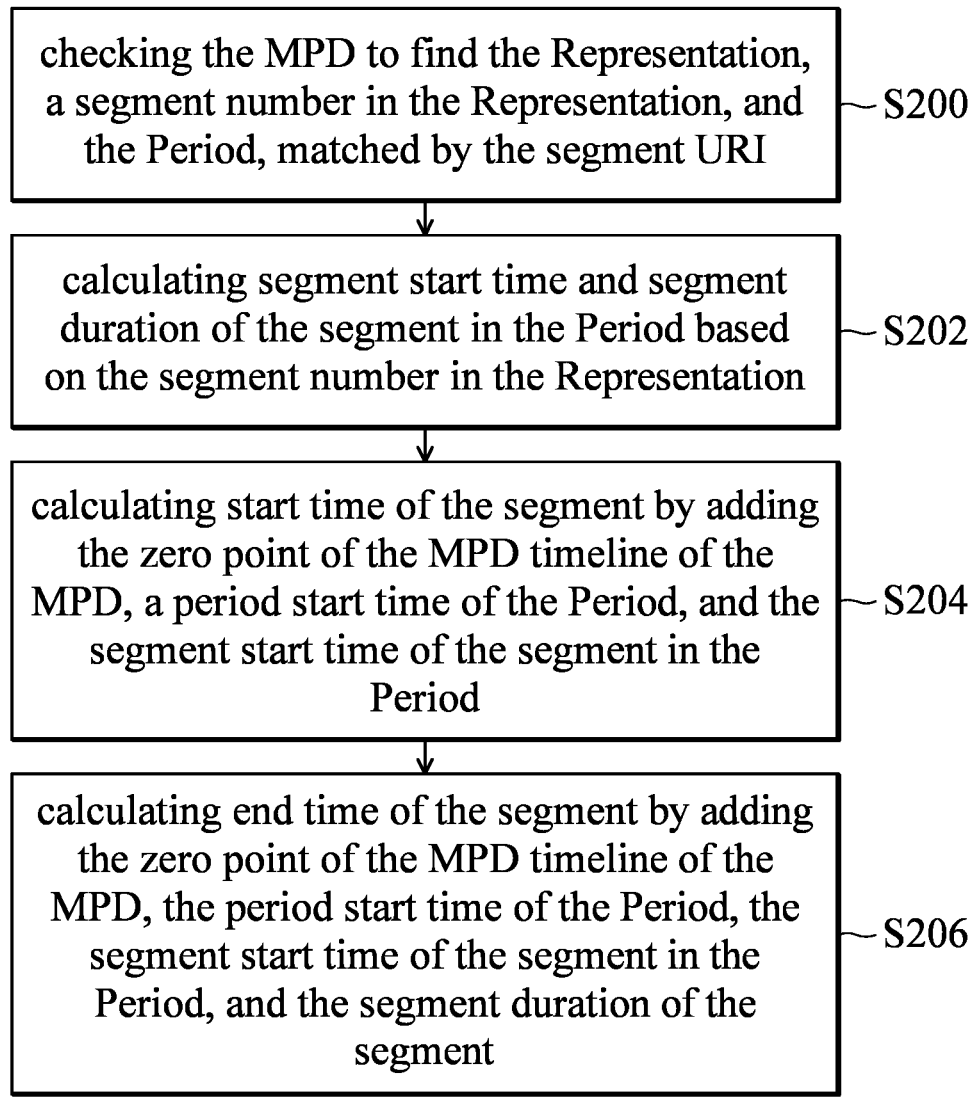
FIG. 2 is a detail flowchart of steps S102 and S104 in FIG. 1 in accordance with some embodiments of the present invention.

FIG. 2 is a detail flowchart of steps S102 and S104 in FIG. 1 in accordance with some embodiments of the present invention. As shown in FIG. 2, the method of the present invention includes checking the MPD to find the Representation, a segment number in the Representation, and the Period, that are matched by the segment URI (step S200); calculating the segment start time and the segment duration of the segment in the Period based on the segment number in the Representation (step 202); calculating the start time of the segment by adding the zero point of the MPD timeline (the zero point of the MPD timeline is mapped to the point (MPD@availabilityStartTime) in wall clock time), a period start time of the Period, and the segment start time of the segment in the Period (the segment start time of the segment in the period is relative to the start time of Period) (step S204); and calculating the end time of the segment by adding the zero point of the timeline of the MPD, the period start time of the Period, the segment start time of the segment in the Period, and the segment duration of the segment (step S206). In other words, step S200 in FIG. 2 is the detail description of step S102 in FIG. 1. Steps S202, S204 and S206 are the detail description of step S104 in FIG. 1.

Figure 3:
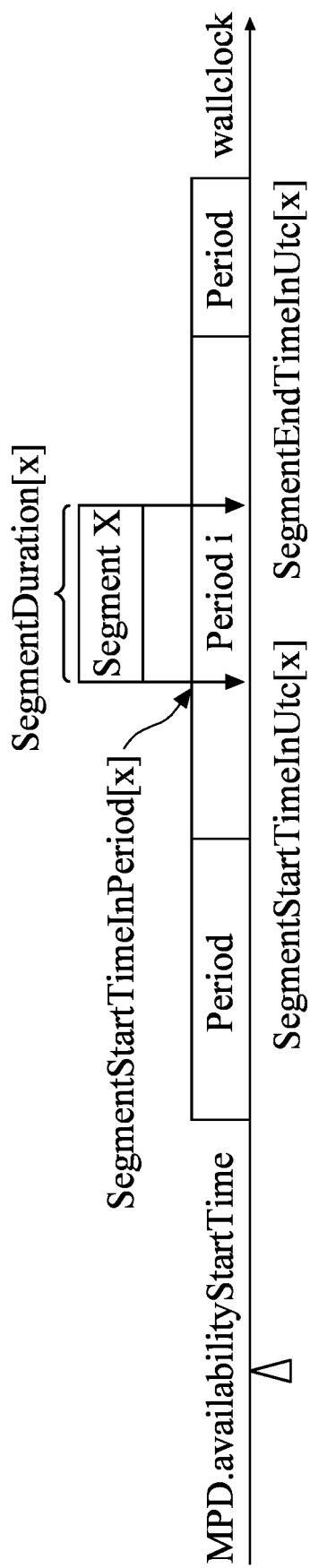
FIG. 3 is a schematic diagram of the method for playing the streaming media in FIG. 2 in accordance with some embodiments of the present invention.

FIG. 3 is a schematic diagram of the method for playing the streaming media in FIG. 2 in accordance with some embodiments of the present invention. FIG. 3 shows a horizontal axis and a wall clock. The wall clock shows time that gradually increases from left to right. After receiving the segment, the segment carries information that includes its own segment URI, thus the method of the present invention can check the MPD to find the Representation, a segment number in the Representation, and the Period, that are matched by the segment URI. For example, the segment number of the received segment is X (marked as Segment X in FIG. 3), and the received segment is located in the Representation in a Period i, and the Segment X is the X-th segment in the Period i. The zero point of the MPD timeline is mapped to the point (MPD@availabilityStartTime) in wall clock time. Then, the method of the present invention calculates segment start time (SegmentStartTimeInPeriod [x]) and segment duration (SegmentDuration[x]) of Segment X based on the segment number X in the Representation in the Period i. After that, the method of the present invention calculates the start time (SegmentStartTime [x]) of Segment X by adding the zero point of the MPD timeline, a period start time of Period i, and the segment start time of Segment X in Period i, that is, (SegmentStartTime [x])= (MPD.availabilityStartTime)+(period start time of Period i)+(SegmentStartTimeInPeriod[x]).

Then, the method of the present invention calculates the end time (SegmentEndTime[x]) of Segment X by adding the zero point of the timeline of the MPD, the period start time of Period i, the segment start time of Segment X in Period i, and the segment duration of Segment X, that is (SegmentEndTime[x])=(MPD.availabilityStartTime)+(period start time of Period i)+(SegmentStartTimeInPeriod[x])+(SegmentDuration[x]).

Figure 4:
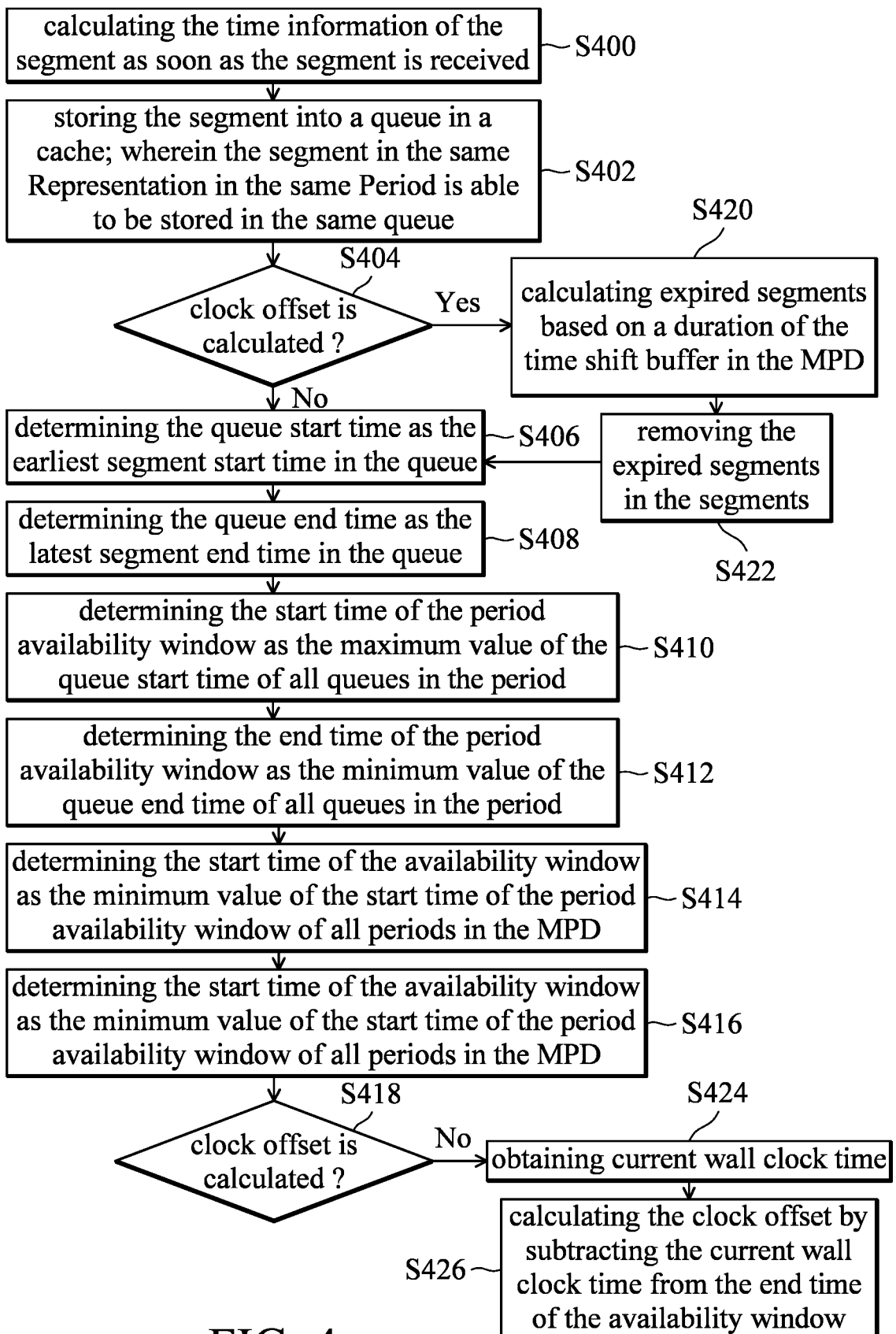
FIG. 4 is a detail flowchart of step S106 in FIG. 1 in accordance with some embodiments of the present invention.

FIG. 4 is a detail flowchart of step S106 in FIG. 1 in accordance with some embodiments of the present invention. As shown in FIG. 4, the method of the present invention includes calculating the time information of the segment as soon as the segment is received (step 400); storing the segment into a queue in a cache, wherein the segment in the same Representation in the same Period is able to be stored in the same queue (step 402); checking if the clock offset is calculated or not at first time (step S404); determining the queue start time as the earliest segment start time in the queue (step S406); determining the queue end time as the latest segment end time in the queue (step S408); determining the start time of the period availability window as the maximum value of the queue start time of all queues in the period (step S410); determining the end time of the period availability window as the minimum value of the queue end time of all queues in the period (step S412); determining the start time of the availability window as the minimum value of the start time of the period availability window of all periods in the MPD (step S414); determining the end time of the availability window as the maximum value of the end time of the period availability window of all periods in the MPD (step S416); checking if the clock offset is calculated or not at second time (step S418); obtaining current wall clock time if the answer is still negative in step S418 (step S424); and calculating the clock offset by subtracting the current wall clock time from the end time of the availability window (step S426).

In some embodiments, if the answer is positive in step S404, that is, the clock offset has been calculated after step S402, then the method of present invention includes calculating expired segments based on a duration of the time shift buffer in the MPD (e.g. MPD@timeShiftBufferDept, the time shift buffer is a time span on MPD timeline that defines the set of media segments that a client is allowed to present at the current moment in time according to the wall clock) (step S420); and removing the expired segments (step S422).

Figure 5:
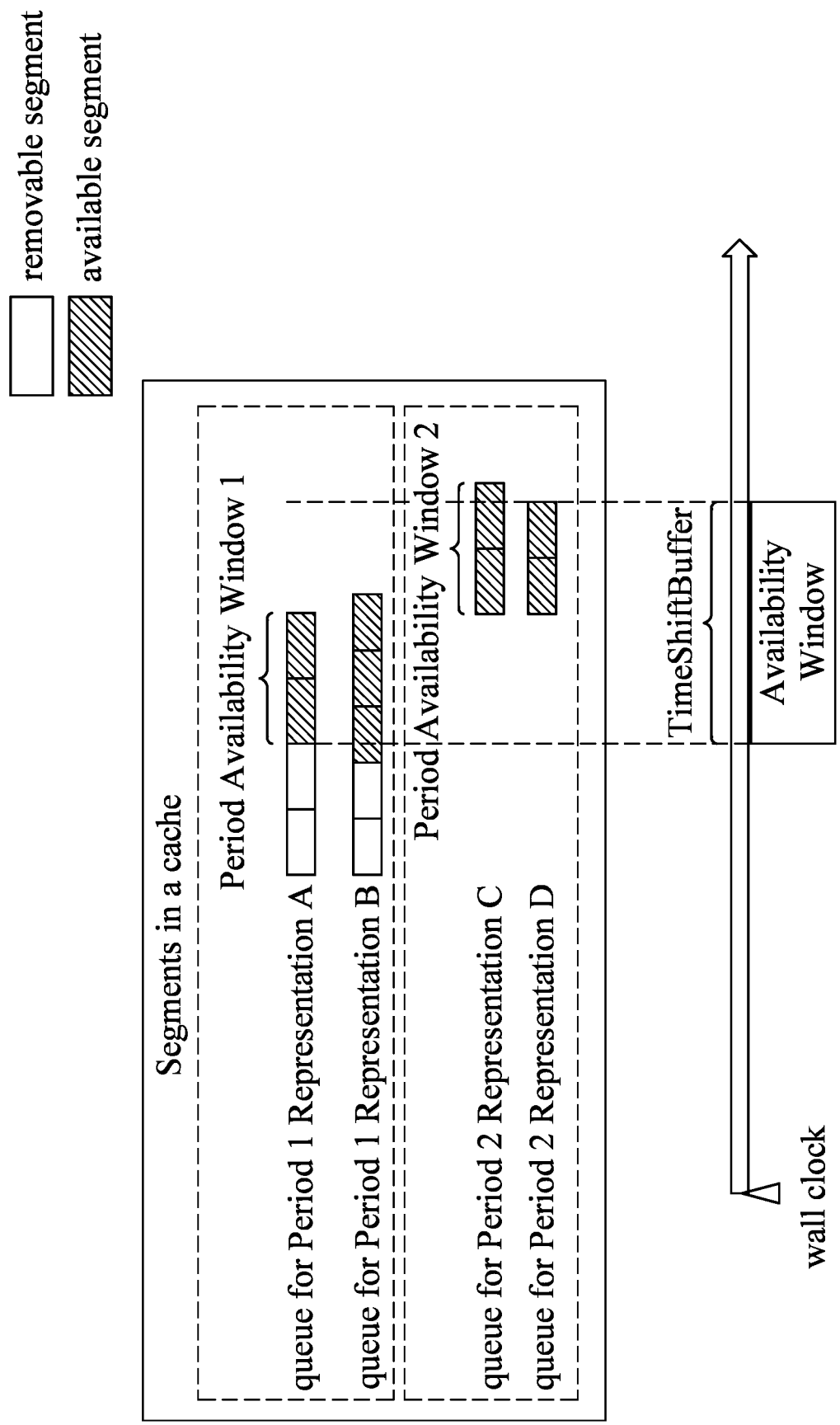
FIG. 5 is a schematic diagram of the method for playing the streaming media in FIG. 4 in accordance with some embodiments of the present invention.

FIG. 5 is a schematic diagram of the method for playing the streaming media in FIG. 4 in accordance with some embodiments of the present invention. As shown in FIG. 5, a plurality of queues stored in a cache is illustrated. For example, a queue for Representation A in Period 1 is illustrated at the top location, a queue for Representation B in Period 1 is illustrated at the second location, a queue for Representation C in Period 2 is illustrated at the third location, and a queue for Representation D in Period 2 is illustrated at the bottom location.

In some embodiments, the segment in the same Representation in the same Period is able to be stored in the same queue in the cache. For example, if the received segment belongs to Representation B in Period 1, the received segment may be stored in the queue at the second location in the cache. If the received segment belongs to Representation C in Period 2, the received segment may be stored in the queue at the third location in the cache.

The horizontal axis in FIG. 5 is the wall clock. The wall clock shows the time that is gradually increased from left to right. For example, if the segment start time of a first segment is earlier than that of a second segment, and the first segment and the second segment both belong to the same Representation in the same Period, the second segment is located at the right of the first segment and is adjacent to the first segment in the same queue. First, the segment start time and the segment end time of the received segment have been calculated in step S104 in FIG. 1 and step S400 in FIG. 5. The received segment has also been stored into a queue in the cache. The method of present invention then calculates time information of the period availability window in of each period in FIG. 5, for example, Period 1 at the top and Period 2 at the bottom. The method of present invention executes the steps S406, S408, S410, and S412 to obtain the start time of the period availability window and the end time of the period availability window. That is, the period availability window 1 in Period 1 and the period availability window 2 in Period 2 are obtained.

After that, the method of present invention calculates the time information of the availability window (marked below the horizontal axis in FIG. 5) by setting the period start time of Period 1 as a start time (the dotted line at the left) of the availability window and setting the period end time of Period 2 as an end time (the dotted line at the right) of the availability window.

After the availability window is obtained, the method of the present invention is able to determine which segment is the removable segment, and which segment is the available segment. For example, the segments in white in FIG. 5 are determined as the removable segments, or the expired segments. The segments in gray in FIG. 5 are determined as the non-removable segments, that is, the available segments. In some embodiments of FIG. 5, the segment fully or partially covered by the availability window in time domain is determined as the available segment. In contrast, the segment not covered by the availability window in time domain is determined as expired segments. The expired segments may be removed after the availability window is determined.

The method of the present invention calculates the expired segments by calculating out all the expired segments based on the parameter called "MPD@timeShiftBufferDepth" and the current wall clock time. After that, the expired segments are then removed from the queue. In detail, the present invention sets the duration of the time shift buffer as "MPD@timeShiftBufferDepth". If "MPD@timeShiftBufferDepth" is not defined in the MPD, let the duration of the time shift buffer be a constant value, such as 30 seconds. In some embodiments, the present invention lets the current time point (NOW) be the current wall clock time according to the wall clock, and lets expired time be the current time point adding the clock offset and minus the duration of the time shift buffer. Then, the present invention traverses each segment of each Queue of each Period. If the segment end time of the segment is less than the expired time, the segment should be regarded as the expired segment. The expired segment may be removed from its queue. The present invention re-calculates the start time of the availability window and the end time of the availability window if any expired segment is removed.

In some embodiments, after the availability window is obtained, the method of the present invention calculates a starting time point of the streaming media and finds the segment corresponding to the starting time point to play according to the start time and the end time of the availability window and the clock offset. In some embodiments, the clock offset (as described in steps S404, S412, S410, S416 and S418 in FIG. 4) is used to compensate the time difference between the current wall clock time and the end time of the availability window. After the clock offset is calculated, the DASH player can generate a new time by adding the current wall clock time from the platform and the clock offset, and use the new time as the accurate wall clock for playback and synchronization.

Figure 6:
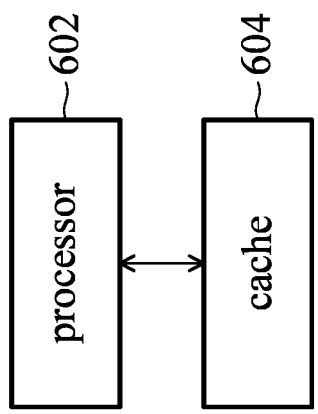
FIG. 6 is a schematic diagram of an electronic device 600 for playing the streaming media in accordance with some embodiments of the present invention.

FIG. 6 is a schematic diagram of an electronic device 600 for playing the streaming media in accordance with some embodiments of the present invention. In some embodiments, the electronic device 600 may be a smart phone, a tablet, a laptop, and a desktop, but the present invention is not limited thereto. As shown in FIG. 6, the electronic device 600 includes a processor 602 and a cache 604. The processor 602 is configured to execute steps S100, S102, S104, S106, and S108 in FIG. 1. In some embodiments, the processor 602 stores the segment into a queue in the cache 604. The segment in the same Representation in the same Period is able to be stored in the same queue, as shown in FIG. 5 in the cache 604.

For the processor 602 executing step S102 in FIG. 1, the processor 602 executes step S200 in FIG. 2 in detail. For the processor 602 executing step S104 in FIG. 1, the processor 602 executes steps S202, S204, and S206 in FIG. 2 in detail. For the processor 602 executing step S106 in FIG. 1, the processor 602 executes steps S400, S402, S404, S406, S408, S410, S412, S414, S416, S418, S420, S422, and S424 in FIG. 4 in detail for different conditions. For example, if the processor 602 does not finish calculating the clock offset after receiving the segment, the processor 602 executes step S406 in FIG. 4. If the processor 602 has finished calculating the clock offset after receiving the segment, the processor 602 executes steps S412 and S414 in FIG. 4. Furthermore, if the processor 602 does not finish calculating the clock offset yet after calculating the time information of the availability window, the processor 602 executes the steps S416 and S418 in FIG. 4. In contrast, if the processor 602 has finish calculating the clock offset after calculating the time information of the availability window, the processor 602 executes step S108 in FIG. 1.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for playing streaming media comprising a plurality of segments, comprising:
   receiving a segment of the streaming media; wherein the segment carries information of a segment Uniform Resource Identifier (URI) corresponding to itself;
   checking a Media Presentation Description (MPD) to find what Period, AdaptationSet, and Representation the segment belongs to based on the segment URI;
   calculating time information of the segment based on time information of the Period where the segment is located and a zero point of an MPD timeline of the MPD;
   calculating time information of an availability window and a clock offset based on the time information of the segment and a duration of a time shift buffer in the MPD; and
   calculating a starting time point of the streaming media and finding the segment corresponding to the starting time point to play according to the time information of the availability window and the clock offset;
   wherein the step of calculating the time information of the availability window and the clock offset based on the time information of the segment and the duration of the time shift buffer in the MPD, comprises:
   determining a queue start time as earliest segment start time in a queue;
   determining a queue end time as latest segment end time in the queue;
   determining a start time of a period availability window as a maximum value of the queue start time of all queues in the period;
   determining an end time of the period availability window as a minimum value of the queue end time of all queues in the period;
   determining a start time of the availability window as a minimum value of the start time of the period availability window of all periods in the MPD; and
   determining an end time of the availability window as a maximum value of the end time of the period availability window of all periods in the MPD.

2. The method as claimed in claim 1, further comprising: removing expired segments from the segments.

3. The method as claimed in claim 2, wherein the step of removing the expired segments from the segments comprises:
   setting a duration of a time shift buffer in the MPD as a predetermined value;
   setting the duration of the time shift buffer as a constant value if the predetermined value is not defined in the MPD;
   setting a current time point as a current wall clock time according to a wall clock;
   setting an expired time be the current time point adding a clock offset and minus the duration of the time shift buffer;
   defining the segments as the expired segments if the segment end time of the segments is less than the expired time; and
   removing the expired segments.

4. The method as claimed in claim 1, wherein the time information of the segment comprises start time and end time of the segment.

5. The method as claimed in claim 4, wherein the step of checking MPD to find what Period, AdaptationSet, and Representation the segment belongs to based on the segment URI, comprises:
   checking the MPD to find the Representation, a segment number in the Representation, and the Period, that are matched by the segment URI.

6. The method as claimed in claim 5, wherein the step of calculating the time information of the segment based on the time information of the Period where the segment is located and the zero point of the MPD timeline of the MPD, comprises:
   calculating segment start time and segment duration of the segment in the Period based on the segment number in the Representation;
   calculating the start time of the segment by adding the zero point of the MPD timeline of the MPD, a period start time of the Period, and the segment start time of the segment in the Period; and
   calculating the end time of the segment by adding the zero point of the MPD timeline of the MPD, the period start time of the Period, the segment start time of the segment in the Period, and the segment duration of the segment.

7. The method as claimed in claim 1, further comprising:
   calculating the time information of the segment as soon as the segment is received; and
   storing the segment into the queue in a cache; wherein the segment in the same Representation in the same Period is able to be stored in a same queue.

8. The method as claimed in claim 1, wherein the time information of the availability window comprises the start time and the end time of the availability window.

9. The method as claimed in claim 1, wherein the step of calculating the time information of the availability window and the clock offset based on the time information of the segment and the duration of the time shift buffer in the MPD, further comprises:
   calculating expired segments in the segments based on the duration of the time shift buffer for any Representation in the MPD if the clock offset has been calculated after the segment is received; and
   removing the expired segments from the segments.

10. The method as claimed in claim 1, wherein the step of calculating the time information of the availability window and the clock offset based on the time information of the segment and the duration of the time shift buffer in the MPD, further comprises:
    obtaining current wall clock time if the clock offset has not been calculated yet after the time information of the availability window is calculated; and calculating the clock offset by subtracting the current wall clock time from the end time of the availability window.

11. An electronic device for playing streaming media comprising a plurality of segments, comprising:
a cache;
a processor, configured to execute the following steps:
receiving a segment of the streaming media; wherein the segment carries information of a segment URI corresponding to itself;
checking a Media Presentation Description (MPD) to find what Period, AdaptationSet, and Representation the segment belongs to based on the segment URI;
calculating the time information of the segment based on the time information of the Period where the segment is located and a zero point on an MPD timeline of the MPD;
calculating time information of an availability window and a clock offset based on the time information of the segment and a duration of a time shift buffer in the MPD; and
calculating a starting time point of the streaming media and finding the segment corresponding to the starting time point to play according to the time information of the availability window and the clock offset;
wherein the processor determines queue start time as earliest segment start time in a queue, determines queue end time as latest segment end time in the queue, determines start time of a period availability window as a maximum value of the queue start time of all queues in the period, determines end time of the period availability window as a minimum value of the queue end time of all queues in the period, determines start time of the availability window as a minimum value of the start time of the period availability window of all periods in the MPD; and determines end time of the availability window as a maximum value of the end time of the period availability window of all periods in the MPD.

12. The electronic device as claimed in claim 11, wherein the processor removes expired segments from the segments.

13. The electronic device as claimed in claim 12, wherein the processor sets a duration of a time shift buffer in the MPD as a predetermined value, sets the duration of the time shift buffer as a constant value if the predetermined value is not defined in the MPD, sets a current time point as a current wall clock time according to a wall clock, sets an expired time be the current time point adding a clock offset and minus the duration of the time shift buffer, defines the segments as the expired segments if the segment end time of the segments is less than the expired time; and removes the expired segments.

14. The electronic device as claimed in claim 11, wherein the time information of the segment comprises the start time and the end time of the segment.

15. The electronic device as claimed in claim 14, wherein the processor checks the MPD to find the Representation, a segment number in the Representation, and the Period that are matched by the segment URI.

16. The electronic device as claimed in claim 15, wherein the processor calculates the segment start time and the segment duration of the segment in the Period based on the segment number in the Representation, calculates the start time of the segment by adding the zero point of the MPD timeline of the MPD, a period start time of the Period, and the segment start time of the segment in the Period, and calculates the end time of the segment by adding the zero point of the MPD timeline of the MPD, the period start time of the Period, the segment start time of the segment in the Period, and the segment duration of the segment.

17. The electronic device as claimed in claim 11, wherein the time information of the availability window comprises the start time and the end time of the availability window.

18. The electronic device as claimed in claim 11, wherein the processor calculates expired segments in the segments based on the duration of the time shift buffer in the MPD if the clock offset has been calculated after the segment is received; and removes the expired segments from the segments.

19. The electronic device as claimed in claim 11, wherein the processor obtains current wall clock time if the clock offset has not been calculated yet after the time information of the availability window is calculated; and calculates the clock offset by subtracting the current wall clock time from the end time of the availability window.

20. The electronic device as claimed in claim 11, wherein the processor stores the segment into the queue in the cache.

21. The electronic device as claimed in claim 11, wherein the segment in the same Representation in the same Period is able to be stored in a same queue.

* * * * *